United States Patent [19]

Reis

[11] 3,819,058

[45] June 25, 1974

[54] DEVICE FOR THE ARRANGEMENT AND MOUNTING OF TOOLS

[75] Inventor: Anton Reis, Erlen, Switzerland

[73] Assignee: Lienhard AG, Erlen, Switzerland

[22] Filed: Apr. 18, 1972

[21] Appl. No.: 245,117

[30] Foreign Application Priority Data
Apr. 21, 1971 Switzerland.......................... 5823/71

[52] U.S. Cl............... 211/60 T, 211/94.5, 211/162, 248/448, 248/316 A
[51] Int. Cl......................... B25h 3/04, A47b 45/00
[58] Field of Search...... 211/94.5, 60 T, 60 A, 69.9, 211/94, 89, 60 R, 68, 162, 1; 108/54, 55; 248/448, 449, 316 A, 201

[56] References Cited
UNITED STATES PATENTS

| | | | |
|---|---|---|---|
| 518,544 | 4/1894 | Faint................................... | 248/449 |
| 784,021 | 3/1905 | Anderson............................ | 211/94 |
| 1,254,172 | 1/1918 | Tefft........................ | 248/316 A UX |
| 1,850,647 | 3/1932 | Whitcomb.......................... | 248/449 |
| 1,853,261 | 4/1932 | Dawson.............................. | 211/89 |
| 1,909,312 | 5/1933 | Page.......................... | 206/62 R UX |
| 2,102,405 | 12/1937 | Coggiola............................. | 211/89 |
| 2,604,998 | 7/1952 | Arbib................................. | 211/94.5 |
| 2,757,804 | 8/1956 | Sadwih............................... | 211/94 |
| 3,008,741 | 11/1961 | MacCormack.................. | 312/140 X |
| 3,192,592 | 7/1965 | Yancey............................ | 24/263 D |

FOREIGN PATENTS OR APPLICATIONS
| | | | |
|---|---|---|---|
| 491,967 | 4/1952 | Canada................................ | 211/89 |
| 1,256,317 | 2/1961 | France................................. | 211/89 |

*Primary Examiner*—Roy D. Frazier
*Assistant Examiner*—Abraham Frankel
*Attorney, Agent, or Firm*—Toren, McGeady and Stanger

[57] ABSTRACT

In a device for the arrangement and mounting of tools and other parts of varying sizes and shapes at least two cross members extend between and are supported by a pair of laterally spaced parallel U-shaped channels. The channels are arranged so that the openings formed by the U-shaped sections are directed toward one another. Rounded ends are formed on the cross members and these ends fit into the U-shaped channels. The cross members can be displaced along the channels and, when positioned, can be secured against displacement by means of set screws and the like. The lateral surfaces of the cross members, extending transversely between the channels, are shaped to afford holding surfaces for securing the tools and other parts between a pair of the lateral surfaces on adjacent cross members.

9 Claims, 4 Drawing Figures

DEVICE FOR THE ARRANGEMENT AND MOUNTING OF TOOLS

SUMMARY OF THE INVENTION

The present invention is directed to a device for the arrangement and mounting of tools of various shapes and sizes, especially sets of tools in an ordered sequence, and, more particularly, it is directed to the configuration of cross members between which the tools are supported.

In the machining of different work pieces and quantities of work pieces, it s necessary, particularly in machine shops, that the tools used in carrying out the machining operation be prepared and preset for each work piece. In machine shops, the preparing and presetting of tools is accomplished not at the location in which the machining operation takes place, but at a location spaced from the location of the machining operation. Generally, the tools are prepared and preset at a storage location where the necessary measuring instruments for the presetting of the tools and the inspection of the tool adjustment are available.

It is important that the tools are stored so that they cannot be damaged and can be brought, in a reliable manner, in the proper sequence to the location of the machining operation where they can be placed into the machine manually or into a machine tool magazine.

For certain machine tools and in certain machine shops, it is known to transport and store the tools in storage fixtures especially made for that purpose in which recesses and holding surfaces matching the tools are provided. However, with such a set up there is the disadvantage that a different storage fixture is required for each work piece to be machined and the fixture must be made in accordance with the requirements of the individual work piece. While this manner of handling the tools may be economically justifiable for a machine tool or in a machine shop having a comparatively limited range of machine operations, however, in machine shops in which a great number of work pieces of different shapes and in small quantities must be machined such an arrangement is impractical.

Accordingly, it is the primary object of the present invention to provide a device for storing tools of any shape and size in which the tools are reliably retained in position. Further, the device can be used for any tools or sets of tools, regardless of the workpiece to be machined.

Therefore, in accordance with the present invention, a device for the arrangement and mounting of tools includes a pair of laterally spaced parallel channels forming a track in which transversely extending cross members can be moved and fixed. The lateral surfaces of the cross members are shaped to provide retaining surfaces so that the facing lateral surfaces of two cross members provide the requisite support for a tool. With this arrangement the cross members can be selectively positioned in a simple manner for holding the tools required for the machining of a work piece or for storing the tools. Further, the configuration of the lateral surfaces of the cross members affords surfaces which can securely retain the tools for dependable storage and mounting purposes.

Preferably, the channels are formed of U-shaped members with the openings of the U-shaped members facing one another and with the ends of the cross members fitted into the groove provided by the U-shaped construction. With this configuration of the channels it is possible to clamp the cross members between the legs of the channels.

For adequately securing the cross members between the U-shaped channels, the cross members have a length extending transversely between the channels substantially equal to the dimension between the inside surface of the webs of the channels which connect the legs of the U-shaped sections. Additionally, the end surfaces of the cross members which fit within the channels are rounded and have a radius equal to one half of the length of the cross members. This rounded construction makes it possible to place the cross members into and remove them from the channels by positioning the cross members extending in the direction of the channels and then turning them through 90° so that their rounded surfaces seat against the bottom surfaces of the U-shaped sections. When the cross members are in position, there is virtually no clearance between them and the juxtaposed web surface of the U-shaped channels and, with this arrangement, the cross members can be seated within the channels even though the ends of the channels are closed, such as by a wall or the like.

The lateral surfaces of the cross members which afford the holding surfaces for tools and the like each have at least one prismatically shaped bearing surface, that is, a pair of surfaces disposed angularly to one another in a V-like grooved configuration. This arrangement of the lateral surfaces affords the possibility of retaining tools of greatly different diameters in a form locking manner.

Additionally, along the lateral sides of the cross members containing the grooved surfaces, a bearing surface is provided which extends transversely outwardly from the profiled surfaces. With this arrangement it is possible not only to retain the tools with the lateral surfaces but also to provide bearing surfaces for the tools.

In the ends of the cross members which fit into the U-shaped channels, threaded holes are provided into which a set screw or the like can be inserted for fixing the position of the cross members relative to the channels. In this arrangement, the set screw is threaded through the hole against the longer leg of the U-shaped section with the result that the surface of the cross member is biased into contact with the inner surface of the shorter leg of the channel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
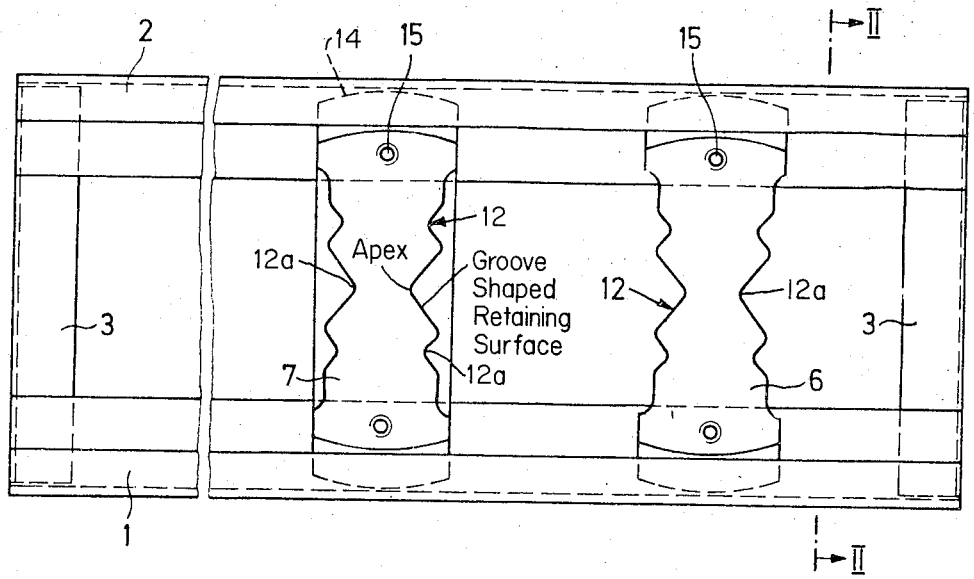
FIG. 1 is a top view of a device embodying the present invention.

In FIG. 1 a pair of elongated laterally spaced parallel channels 1 and 2 are shown which form the support for a device for the arrangement and storage of tools. At each end, the channels are supported on an angle shaped member 3 which, in turn, is mounted in a tool cabinet or in a fixed or mobile housing or frame. The channels 1 and 2 can be of any desired length and, similarly, the lateral spacing between them can be varied.

Figure 2:
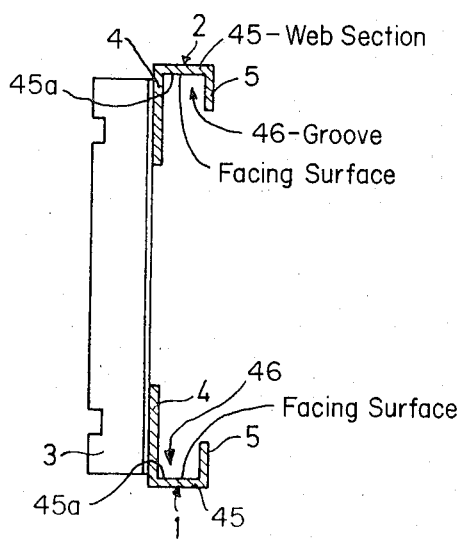
FIG. 2 is a sectional view taken along the line II—II in FIG. 1.

As shown in FIG. 2, the channels 1,2 are formed of U-shaped sections each having a longer leg 4 arranged downwardly and supported on the angle member 3 and a shorter upper leg 5 with a web section 45 interconnecting the two legs. Each channel 1,2 forms an elongate group 46 defined by the inwardly facing surfaces of the legs 4,5 and the inwardly facing web surface 45a.

Figure 4:
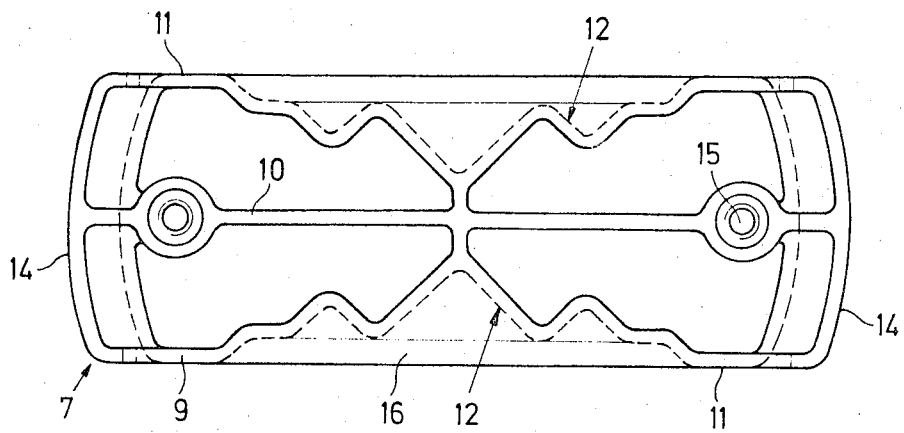
FIG. 4 is a bottom view of the member shown in FIG. 3.
Figure 3:
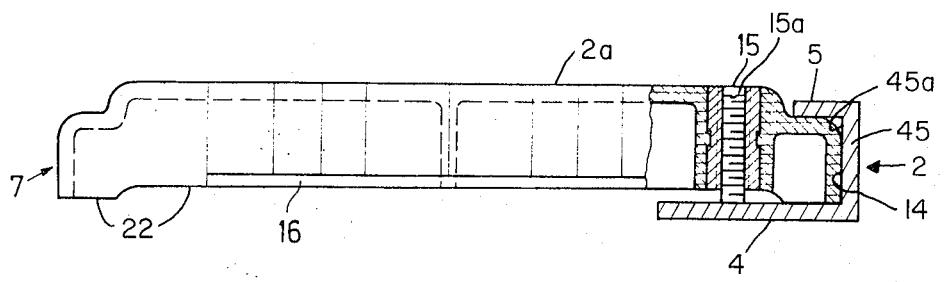
FIG. 3 is an enlarged side view, partly in section, of one of the members shown in FIG. 1.

Extending between the channels, that is transversely of the longitudinal direction of the channels, are a pair of identically shaped cross members 6, 7. In FIGS. 3 and 4 the cross member 7 is shown on a larger scale than that in FIG. 1. The cross members 6 and 7 are formed of a suitable material, such as a plastic, and are reinforced by ribs 9 which extend along the edges of the member and by inside ribs 10. The lateral surfaces 11, that is the surfaces extending between the channels, are provided with a recessed configuration presenting one or more prismatically shaped or grooved retaining surfaces 12, note in FIGS. 1 and 4 that three such surfaces each having a V-shaped configuration are provided on each side of the cross members 6, 7, The retaining surfaces 12 are recessed inwardly in an angularly disposed arrangement terminating in an inwardly directed apex 12a so that they can engage tools in a form-locking manner and can secure tools of various diameters. As mentioned above, the tools would be secured between the grooved retaining surfaces 12 along the lateral sides of two adjacent cross members.

As can be seen in FIG. 3, the end faces or surfaces 14 of the cross members 6, 7 are somewhat lower than the lateral surfaces 11 which extend between them. Further, as can be noted in FIGS. 1 and 4, the end faces 14 form parts of a circular cylinder and the exterior surface has a radius equal to half of the overall length of the cross members, which corresponds to the distance between the facing web surfaces 45a of the U-shaped channels, that is, the inside bottom surfaces of the channels. As viewed in FIG. 3, each cross member has an upper or first surface 20 and a lower or second surface 22, the first and second surfaces extend, in one direction, between the end surfaces 14 and, in the direction transverse thereto, between the lateral surfaces 11. In position within the channels, the upper legs 5 extend over the upper a first surface 20 the adjacent end surfaces 14. Within the portion of the cross member which extends over the lower legs 4 but is spaced from the upper legs 5, a threaded hole 15 is provided into which a set screw 15a or the like is inserted. After the cross members are properly positioned within the channels, the set screw 15a is threaded into the hole 15 until it contacts the lower leg 4. As the screw is continued to be threaded the cross member is lifted by the threading action and the upper or first surface 20 adjacent the end surfaces 14 are biased into a tightly fitting engagement with the inside surface of the upper leg 5 of the channels 1,2.

As can best be seen in FIGS. 3 and 4, a bearing surface 16 extends laterally outwardly from the lower edges of the lateral surfaces 11 for the extent of the angularly profiled or grooved retaining surfaces 12. When a tool is secured between the retaining surfaces 12 the bearing surface 16 provides a support surface against which the tool can be rested.

For the form-locking engagement and storage of tools, two cross members are suitably spaced apart and clamped to the channels 1,2 to provide the requisite mounting for the tools. Additional cross members 6 or 7 can be provided for juxtaposed tools with the spacing between the cross members determined by the shape of the tools to be engaged.

It would not present any problem to arrange two or more pairs of the channels 1,2 on top of one another in order to provide a multiple mounting and retention arrangement for the tools. In such an arrangement the shape and size of the tools need not be taken into consideration. The random arrangement of the cross members allows all the requirements that are necessary. While the length and spacing of the channels can be selected as required, it has been proven that most requirements can be met by one spacing of the channels and by two designs of the retaining surfaces of the cross members 6, 7. While cross member 7 has in the region of the retaining surfaces 12 the bearing surface 16, this bearing surface is omitted on cross member 6.

While a specific embodiment of the invention has been shown and described in detail to illustrate the application of the inventive principles, it will be understood that the invention may be embodied otherwise without departing from such principles.

What is claimed is:

1. A device for the arrangement and mounting of tools and other parts of varying sizes and shapes, such as the arrangement of a set of tools in an ordered sequence, comprising a pair of spaced apart U-shaped channel members disposed in parallel relationship and with each of said U-shaped channel members forming a groove with the openings into the grooves directed toward one another in facing relationship, each said U-shaped channel member comprising a pair of spaced legs connected by a web section forming the bight portion of said U-shaped member, one of said legs being longer than the other said leg with its free edge disposed inwardly closer to the other said channel member than the free edge of the other said leg, support members secured to and extending between said channel members and maintaining said channel members in spaced relationship, at least two cross members extending transversely of said channel members and spaced from one another, each said cross member having a pair of end surfaces with each said end surface fitted into the groove in a different one of said channel members, each said cross member having a first surface and an oppositely directed second surface, said first and second surfaces extending between said end surfaces with said second surface adjacent said end surfaces being disposed adjacent to and facing toward the longer legs of said channel members, each said cross member having spaced lateral surfaces extending between said end surfaces in one direction and in the direction transverse thereto between said first and second surfaces, at least one of said lateral surfaces of each said cross member having at least one grooved retaining surface therein with the groove in said retaining surface extending between said first and second surfaces of said cross member and facing toward another similarly shaped said grooved retaining surfaces on an adjacent said cross member for holding a part therebetween, said cross members being movably displaceable within the grooves in said channel member for selectively spacing said retaining surfaces on adjacent said cross members, and means associated with said cross members and arranged to cooperate with said longer legs of said channel members for fixedly positioning said cross members within the grooves in said channel members.

2. A device, as set forth in claim 1, wherein said grooved retaining surface having at least two planar surfaces disposed in angular relationship to one another and converging toward one another as they extend inwardly toward the base of the groove.

3. A device, as set forth in claim 1, wherein each said grooved retaining surface has at least a pair of angularly disposed surfaces intersecting at an inwardly directed apex recessed inwardly from said lateral surface and said pair of angularly disposed surfaces having a V-shaped configuration.

4. A device, as set forth in claim 3, wherein each said retaining surface has a bearing surface extending generally perpendicularly to its height dimension extending between said first and second surfaces of said cross member and extending outwardly toward said retaining surface on the adjacent said cross member.

5. A device, as set forth in claim 4, wherein each said lateral surface of said cross members includes a plurality of said angularly disposed surfaces having a V-shaped configuration formed in each said retaining surface with at least two of said pairs of angularly disposed surfaces extending inwardly into said cross member from said lateral surface for different extents.

6. A device, as set forth in claim 1, wherein said web sections are arranged perpendicularly to said legs of said channel members, and the maximum length of said cross members between said end surfaces thereof is approximately equal to the spacing between the facing surfaces of said web sections within the grooves in said channel members so that said end surfaces of said cross members fit closely to the facing surfaces of said web sections while maintaining movable displaceability.

7. A device, as set forth in claim 6, wherein said end surfaces of said cross member are formed with a circular cylindrical configuration having a radius equal to one-half of the length of said cross members measured in the direction between said channels so that the rounded arc of said end surfaces extends in the plane of said first and second surfaces between said lateral surfaces.

8. A device, as set forth in claim 7, wherein said cross member has a hole formed therethrough from said first surface to said second surface adjacent each of said end surfaces thereof with the dimension between said hole and the adjacent end surface being less than the length of the longer one of said legs and greater than the length of the shorter one of said legs from said web section thereof, and said means associated with said cross member comprises a screw disposed in threaded engagement within each hole in said cross member and displaceable therethrough into engagement with said longer leg of said channel member for fixing said cross members to said channel members.

9. A device, as set forth in claim 7, wherein the dimension between the facing surfaces of said legs of said channel members is greater than the dimension of the rounded end surfaces of said channel members extending between said first and second surfaces so that said rounded end surfaces fit into the grooves formed between said legs of said channel members.

\* \* \* \* \*